United States Patent
Rodriguez et al.

(10) Patent No.: US 6,838,108 B2
(45) Date of Patent: Jan. 4, 2005

(54) PRODUCTION PROCESS OF A NEW APPETIZER AND PRODUCT OBTAINED

(76) Inventors: Espiridion Valdes Rodriguez, Calle Eriberto Enriquez No. 646, Colonia Santa Maria de las Rosas, 50140 Toluca (MX); Efrain Joel Peña Sanchez, Calle Oceano Indico No. 38, Colonia Lomas Lindas, 54500 Atizapan de Zaragoza (MX)

( * ) Notice: Subject to any disclaimer, the term of this patent is extended or adjusted under 35 U.S.C. 154(b) by 0 days.

(21) Appl. No.: 10/136,152

(22) Filed: May 1, 2002

(65) Prior Publication Data
US 2002/0168458 A1 Nov. 14, 2002

Related U.S. Application Data

(63) Continuation-in-part of application No. 09/812,456, filed on Mar. 20, 2001, now abandoned.
(51) Int. Cl.⁷ .................................................. A21D 8/00
(52) U.S. Cl. ...................... 426/549; 426/438; 426/439; 426/506; 426/507; 426/508; 426/560; 426/808
(58) Field of Search ................................ 426/506, 507, 426/508, 438, 439, 94, 549, 622, 808, 560

(56) References Cited

U.S. PATENT DOCUMENTS

| | | |
|---|---|---|
| 3,117,868 A | 1/1964 | Madrazo et al. |
| 3,369,908 A | 2/1968 | Gonzalez et al. |
| 3,859,452 A | 1/1975 | Mendoza |
| 4,221,340 A | 9/1980 | Dos Santos |
| 5,176,931 A | 1/1993 | Herbster |
| 5,298,274 A * | 3/1994 | Khalsa ....................... 426/560 |
| 6,025,011 A | 2/2000 | Wilkinson et al. |
| 6,265,013 B1 | 7/2001 | Martinez-Montes et al. |
| 6,277,421 B1 | 8/2001 | Burge |

* cited by examiner

*Primary Examiner*—Lien Tran
(74) *Attorney, Agent, or Firm*—Fish & Richardson P.C.

(57) ABSTRACT

A process for production of an appetizer is disclosed. The process comprises the steps of: a) adding between about 1.0 percent to 1.5 weight percent lime to a combination of water and corn to form a mixture; b) boiling the mixture until the mixture contains between about 34 to 38 weight percent moisture; d) soaking the mixture for between about 12 to 16 hours to achieve between about 46 to 52 percent moisture; d) grinding said mixture into a dough; and e) rolling and cooking said dough to produce the appetizer. This process has the quality of permitting a new product from the nixtamalized corn dough, which is acceptable to the public, and a technology that allows for the accomplishment of the above objective.

14 Claims, No Drawings

_US 6,838,108 B2_

PRODUCTION PROCESS OF A NEW APPETIZER AND PRODUCT OBTAINED

CROSS REFERENCE TO RELATED APPLICATION

This application is a continuation-in-part of the patent application U.S. patent application Ser. No. 09/812,456 filed Mar. 20, 2001 now abandoned.

This invention is related to the appetizer production industry. More specifically, the invention relates to a process for making a new appetizer based on nixtamalized corn dough and a product made by this method.

BACKGROUND OF THE INVENTION

In the appetizer production industry there has been an explosion of new products, from simple roasted peanuts, going through potato chips. The differences among them have to do with many factors—the raw material starting from which such appetizers are made, the flavor that is added to them, the process of appetizer production, among other factors. For example, we have simple salted potato chips, which may differ according to the frying process. There are peanuts, which may be fried, roasted, only salted, or made with dry and ground chili powder.

With the development of food industry technology, new products have appeared. These products are obtained by means of extrusion of some dough of a different composition. This technology permits obtaining products of more homogeneous characteristics and of more varied conformation and dimensions. For example, we have the imitations of slices of potato chips, fried flours, and mixtures of flours and other raw materials, shaped as "churros" (fritters), more or less regular in their shape, and so forth. On the other hand, there are at present, basically, two products made from nixtamalized corn dough—"totopos" (corn tortillas) and the so-called "churritos" (small "churros" or small fritters). "Totopos" may be triangular or round in shape. Until now, there have been no modifications to these types of products made from nixtamalized corn dough.

To gain part of the market, a nixtamalized corn dough product different from those already known would be quite desirable. The modifications have consisted in adding new flavors by means of new mixtures of flavors. However, the product conformation has not been altered and this factor of generation of new products has not been developed. Conformation changes, although they mean a certain advantage due to the novelty effect on the public in general, and on children in particular, they also mean new technologies of conformation and manufacture are necessary to develop.

Besides, the product in itself, in spite of having novelty, does not mean it will have acceptance on the market, and important investments are required including research and development of new products and the processes to produce them. Furthermore, tasting panels provide a more precise idea of the acceptance of the new product on the market.

BRIEF SUMMARY OF INVENTION

The subject invention is a process for production of an appetizer comprising the steps of: a) adding between about 1.0 percent to 1.5 weight percent lime to a combination of water and corn to form a mixture; b) boiling the mixture until the mixture contains between about 34 to 38 weight percent moisture; d) soaking the mixture for between about 12 to 16 hours to achieve between about 46 to 52 percent moisture; d) grinding said mixture into a dough; and e) rolling and cooking said dough to produce the appetizer.

The word nixtamal is a Spanish word meaning boiled corn. Nixtamalized corn as used herein means cooking corn, or corn that is boiled in water with lime. Nixtamalizacion means the corn boiling process. The lime, calcium hydroxide (CaOH$_2$), is added to the corn and water combination to prevent cellulose from sticking to the grains of corn. The mixture as used herein is the corn, water and lime.

This method permits an appetizer product made from nixtamalized corn dough to be shaped in a wide variety of configurations and dimensions including that of a small taco, attractive to the consuming public.

DETAILED DESCRIPTION OF THE INVENTION

One of the aspects of this invention consists in a new appetizer made from nixtamalized corn dough that has the shape of a small Mexican "taco" (rolled up tortilla). This "taco" is fried to give it the feature of being crackling, but not too greasy. Some special flavor can also be provided to it with a flavoring composition.

Once the product has been defined starting from marketing studies, and once the product has been defined from the first instance, the process for obtaining the same requires multiple tests. Production of a small "taco" from the small raw tortilla meant barriers unlikely to be overcome due to the impossibility of giving a perfect rolling up to the product before frying it.

Initially, it was decided roll up of the tortilla while still raw. In the beginning it was thought to use the tortilla with a round conformation. As it turned out, this conformation was too thick in the center, creating problems when frying it since too much grease was retained which was not accepted by the public and creates a higher production cost.

To solve the problem, a conformation of a small raw tortilla, a slice of pie (triangular) or the form of a caricature of a heart was used.

While the problem was solved quite well, the consistency of the dough was not adequate to provide it a certain superficial adherence. The raw tortilla could not adhere appropriately to the surface of the element with which the rolling up was performed. This consistency did not permit rolling up without breaking the small tortilla.

Besides such consistency, an adequate thickness of such small tortilla was sought so that the process would work well. It.was found that the optimum thickness should be of approximately 1 mm, and such thickness could vary up to 2 mm. A smaller thickness would mean problems for its conformation and a thickness greater than 2 mm would have frying problems by keeping too much grease or high oil content, a longer frying time, and a harder consistency.

The nixtamalization process of the corn and the grinding of the same should be the optimum ones to obtain a good consistency. In this process, the parameters of time and temperature of nixtamalization should be such to obtain in the grain moisture of between about 34 to 38%. It was found that the amount of lime added for nixtamalization should be between about 1.0 and 1.5% in weight with respect to the dry weight of corn.

The resting time of the nixtamalized corn is the time that the mixture of corn, water and lime is soaked without agitating or boiling. The soaking time will vary between about 12 and 16 hours. This is the time required to obtain moisture in the grain mixture of between about 46 to 52%.

In any case, grinding should be performed such as not to have a sandy consistency to the touch. That is, that the size of the particle should be such that it is not detected by touch. If necessary, water may be added when grinding the mixture. The water added should be enough in order for about 50% moisture in the mixture. This resulted in a flexible tortilla with a good characteristic of surface adherence to make rolling up possible.

Another feasible option is the utilization of nixtamalized corn flour to shape the small raw tortilla in the defined conformation. Preferred starting conformations of the small raw tortilla include a slice of pie (triangular) or the form of a caricature of a heart. The rheologic features of the dough made from the grinding of nixtamalized corn and that of the dough made from reconstituted nixtamalized corn flour are quite different, since the flour has a greater absorption of water than the dough.

In the preferred embodiment, the dough has a fat content between about 27 to 34 percent in weight to ensure adequate frying.

The level and uniformity of the quality of the corn grain used as raw material for the nixtamalización (corn boiling process) is determinative of the quality of the end product. The establishment of maximum range of variability in the characteristics of the grain may be useful to optimize processes even though an increase of the cost of corn may be incurred. Broken grains make diffusion of humidity in the corn boiling process to be faster, compared to the boiling process of the whole grains providing for a result a non-homogenous nixtamal, or boiled corn. However, the amount of broken grains must not exceed two percent (2%).

In a preferred embodiment of the method of the subject invention, in order to make a cocido or boil, 1000 liters of water must be put in the cooking bowl, this quantity of water will guarantee that the 900 kilograms of corn will be fully covered, achieving a more homogenous boiling. The corn, water and lime mixture boils at between about 91 to 93° C. or between about 196 to 200° F.

Boiling the corn allows to hydrate the grain to smooth the pericarp, to denaturalize proteins and to partially gelatinize the starch. The hardness of the endosperm partially determines the speed of water penetration during boiling. The soft grains are rapidly hydrated, requiring short periods of boiling, but they are very sensitive to overcooking. Intermediate to high hardness grains are adequate for the nixtamalización or corn boiling process due to the fact that they have a higher margin of control of the process. The easiness by which the pericarp is eliminated during the corn boiling process affects the permeability of the grain in the water. When the pericarp is eliminated or easily and rapidly softened during the boiling process, penetration of water is fast and the grain soon boils. Therefore, retaining the pericarp in the final product may result in a major cohesiveness.

In order to achieve retention of pericarp, in the preferred embodiment of the subject invention, twelve (12) kilograms of calcium hydroxide (lime) are added to the water, and the water begins to be stirred. By adding this amount of calcium hydroxide, an adequate gelatinization level is reached. The gelatinization level determines viscosity, adhesiveness and cohesiveness of the dough obtained after grinding.

Water vapor is used as heating means during the entire process. The total boiling time includes from the moment water is added and until such time the bowl is removed to the resting area and in the preferred embodiment is about 44 minutes. The effective boiling time of the mixture (water, calcium hydroxide and corn) is 17 minutes to achieve a 34 to 36% humidity percentage of the grain.

In order to stop the gelatinization process and to prevent overcooking, cold water is added until an approximate temperature of 70° C. is reached. Once the boiling process is finished, corn, water and lime mixture is left to rest for 12 to 16 hours in order for the nixtamal (boiled corn) to reach a humidity percentage of 46 to 50%.

After the resting or soaking period, washing the nixtamal (boiled corn) eliminates the pericarp already softened, the excess of calcium hydroxide, and water used during boiling nixtamalizacion (corn boiling process). Washing must be as uniform as possible and it should take the nixtamal to a temperature below 35° C. with as little water as possible.

The mixture produces corn dough composed of various types of particles including fragments of grain, pericarps and germs, as well as starch, proteins and hydrated fibers, having a humidity of 46 to 52% is then grinded. The condition of the nixtamal (boiled corn), the type of stone, the separation between stones, and the added water, are factors to be controlled during the grinding process.

The grinding of overcooked nixtamal (boiled corn), with high humidity content, generates heat excess and tends to produce sticky dough that dries quickly and cannot be laminated. The purpose of grinding is to obtain fine and homogeneous dough that allows us to achieve a product with a fat absorption within our quality specifications, between 27 and 30% of fat absorption, and good enough to be eaten. The dough temperature must not exceed 55° C. at no more than 70 amperes in the ammeter of the grind.

The dough is then shaped. It is in this stage where a great part of the effects of the aforementioned boiling, washing and grinding processes are reflected. It is also important to perform a plastizado in order to obtain an improvement of the consistency of the dough, and the adequate adjustment of the rolling pins and the shaper of the laminator, in order to obtain a product figure with an average weight of 2.8 grams to 3.6 grams.

If an adequate level of humidity of the dough is not achieved, the product turns fragile and cannot be rolled. If the humidity level of the dough is exceeded, the dough turns sticky and cannot be cast in the mould, remaining stuck to the laminating rolling pins. The dough is passed through metal trays in order to roll it, and to have the appearance of a Mexican taco. In a preferred embodiment of the invention, the trays that roll the tortilla are 16 centimeters long and 2.6 centimeters wide. The cast used to make the figures is 10 figures wide, each figure measures 7.5 centimeters by 5.5 centimeters. The cast is 90 centimeters wide. The tray that takes the figure to the trays that roll them works at 102 r.p.m.

To bake, the figure is passed through a three step oven with a temperature between 600 and 670° F. for 42 to 50 seconds, the lower the temperature, the higher the resistance time of the figure in the oven and viceversa. By the end of this process, a tortilla with an acceptable color, and a humidity percentage of 37 to 40% is obtained. After this process, the tortilla is too hot, therefore it is necessary to lower its temperature before it is taken to the flying machine. The entrance to the frying machine is delayed for a period of 3 to 3.25 minutes, passing the tortilla through a stabilizer, which is a three step equipment where the tortilla transfers the heat to the air in the environment, reducing to approximately 35° C.

During the frying process there is exchange from water to oil in the tortilla. Hence, the adequate level of oil in the frying machine must be carefully taken care of, adding continuously oil to the frying machine. It is also important to remove the remains that may be left at the bottom of the frying machine in every moment during the process, as well as to take care of the free fat acids. Frying is performed at a temperature of 195 to 205° C. for 140 to 190 seconds, thus obtaining a fried tortilla with a humidity percentage of between 1.5 and 2% and a fat absorption of between 27 and 30%.

In a final stage, seasoning may be added to the fried product by means of a seasoning curtain, spinning the product in a cylinder to have a uniform distribution in all the flying product. A fried product with a fat percentage of between 2.1 and 2.5% is obtained.

EXAMPLE 1

The corn was nixtamalized with 0.75% of lime with respect to the dry weight of corn. The boiling time and temperature required to obtain the moisture from 34 to 38% in weight in the grain was too much. The mixture was left resting until it reached room temperature. When grinding the grain down to such a degree that the granules were no longer perceptible to the touch, the dough reaching 50% moisture resulted and was not malleable. The dough was very loose.

EXAMPLE 2

The corn was nixtamalized with 2.0% lime with respect to the dry weight of corn. A moisture from 34 to 38% in weight in the grain was obtained and it was left resting until it reached room temperature after boiling. When grinding the grain down to a degree such that the granules were no longer perceptible to the touch, the dough was of adequate consistency resulted, but having unacceptable flavor and color.

EXAMPLE 3

The corn was nixtamalized with 1.5% lime with respect to the dry weight of corn. A moisture from 34 to 38% in weight in the grain was achieved. The grain was left resting until it reached room temperature. When grinding the grain down to a degree such that the granules were no longer perceptible to the touch, the dough was of adequate consistency resulted having acceptable flavor and color.

EXAMPLE 4

The corn was nixtamalized with 1.0% lime with respect to the dry weight of corn, and boiled to obtain moisture from 34 to 38% in weight in the grain. Once room temperature was reached, the grain was ground down to a degree such that the granules were no longer perceptible to the touch resulting in the dough was of adequate consistency and acceptable flavor and color.

EXAMPLE 5

The corn was nixtamalized with 1.0% lime with respect to the dry weight of corn. After boiling the mixture, 25% moisture in weight in the grain was obtained. Upon cooling to room temperature, the grain was ground down to a degree such that the granules were no longer perceptible to the touch. Water was added to 50%. The dough was of loose consistency, could not be handled and fell apart. A small tortilla could not be formed.

EXAMPLE 6

The corn was nixtamalized with 1.0% lime with respect to the dry weight of corn. 40% moisture in weight in the grain was obtained. After reaching room temperature, the grain was ground to a degree such that the granules were no longer perceptible to the touch. Water was added to 50%, resulting in a dough of chewing gum consistency that could not be handled, did not adhered to any surface, and could not form a small tortilla.

EXAMPLE 7

The corn was nixtamalized with 1.0% lime with respect to the dry weight of corn. After heating over a period of time, 34% moisture in weight in the grain was obtained. After reaching room temperature, the grain was ground to a degree such that the granules were no longer perceptible to the touch. Water up to 50% was added, resulting in dough of adequate consistency for forming the small tortilla.

EXAMPLE 8

The corn was nixtamalized with 1.0% by weight of lime with respect to the dry weight of corn and boiled to obtain 38% by weight moisture in the grain mixture. After cooling to room temperature, the grain was ground down to a degree such that the granules were no longer perceptible to the touch and water was added up to 50% by weight. The dough was of adequate consistency for forming the small tortilla resulted.

EXAMPLE 9

The corn was nixtamalized with 1.0% by weight of lime with respect to the dry weight of corn and boiled to obtain 38% by weight moisture in the grain mixture. The grain was left resting until it reached room temperature. The grain was ground down to a degree such that the granules were no longer perceptible to the touch. Water was added up to 45% by weight. This resulted in dough of adequate consistency to form a small tortilla and perform rolling up of the same.

EXAMPLE 10

The corn was nixtamalized with 1.0% lime with respect to the dry weight of corn, and the boiling time required to obtain 38% moisture in weight in the grain. When grinding the grain down to a degree such that the granules were no longer perceptible to the touch, water was added up to 40% by weight. This resulted in dough of fragile and dry consistency for forming a small tortilla and for performing rolling up of the same.

EXAMPLE 11

The corn was nixtamalized with 1.0% lime with respect to the dry weight of corn. After heating to obtain 38% moisture in weight in the grain, the grain was ground to a degree such that the granules were no longer perceptible to the touch and water was added up to 50% by weight. This resulted in dough of chewing gum consistency with an excessive gelatinization of starch, which caused multiple problems to form a small tortilla and perform rolling up of the same.

EXAMPLE 12

Nixtamalized corn flour was reconstituted by adding water up to 50%. This resulted in dough of adequate consistency to form the small tortilla and perform rolling up of the same.

The invention has been described sufficiently so that a person with ordinary skill in the art may be able to reproduce and obtain the results mentioned in this disclosure. However, any person capable in the field of the techniques corresponding to this invention may be able of performing modifications not described in this application.

While this invention has been described with a reference to illustrative embodiments, this description is not to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

Although the preferred embodiments of the invention have been described in the foregoing Detailed Description, it will also be understood that the invention is not limited to the embodiments disclosed, but is capable of numerous rearrangements, modifications and substitutions without departing from the spirit of the invention.

We claim:

1. A process for production of an appetizer comprising the steps of:
   (a) adding between about 1.0 percent to 1.5 weight percent lime to a combination of water and corn to form a mixture;
   (b) boiling said mixture until the corn contains between about 34 to 38 weight percent moisture;
   (c) resting said boiled mixture for a time sufficient to allow the corn to reach room temperature;
   (d) adding moisture to the boiled-rested mixture to achieve a moisture content between about 46 to 52 percent and grinding said moisture-added mixture to obtain a homogenous dough
   (e) rolling and cooking said dough to produce the appetizer.

2. The process of claim 1 wherein the corn contains less than two percent broken grains.

3. The process of claim 1 further comprising the step of washing said mixture after soaking to remove softened pericarp, excess calcium hydroxide and excess water.

4. The process of claim 1 wherein the mixture temperature during grinding is less than or equal to 55° C.

5. The process of claim 1 wherein the mixture is ground at a speed of less than or equal to 70 amperes in the ammeter of the grinder.

6. The process of claim 1 wherein the dough is shaped into a figure having a weight between 2.8 to 3.6 grams.

7. The process of claim 6 wherein said dough is baked at a temperature between 600° F. to 670° F. for 42 seconds to 50 seconds.

8. The process of claim 7 wherein said dough is fried in oil at a temperature between 195 to 205° C. for between 140 to 190 seconds.

9. The process of claim 1 further comprising the step of adding seasoning to the appetizer.

10. The process at claim 1 wherein the corn is completely immersed in water.

11. The process of claim 1, wherein the dough is formed into the shape of a slice of pie.

12. The process of claim 1, wherein the dough is formed into the shape of a heart.

13. The process of claim 1, wherein the dough is formed into the shape of a taco and subsequently fried.

14. The process of claim 1, wherein the dough is rolled prior to cooking.

* * * * *

UNITED STATES PATENT AND TRADEMARK OFFICE
CERTIFICATE OF CORRECTION

PATENT NO. : 6,838,108 B2 Page 1 of 1
DATED : January 4, 2005
INVENTOR(S) : Espiridion Valdes Rodriguez and Efrain Joel Pena Sanchez It is certified that error appears in the above-identified patent and that said Letters Patent is hereby corrected as shown below:

<u>Column 8,</u>
Line 20, after "process" delete "at" and insert -- of --.

Signed and Sealed this

Eleventh Day of April, 2006

JON W. DUDAS
*Director of the United States Patent and Trademark Office*